Figure 9:
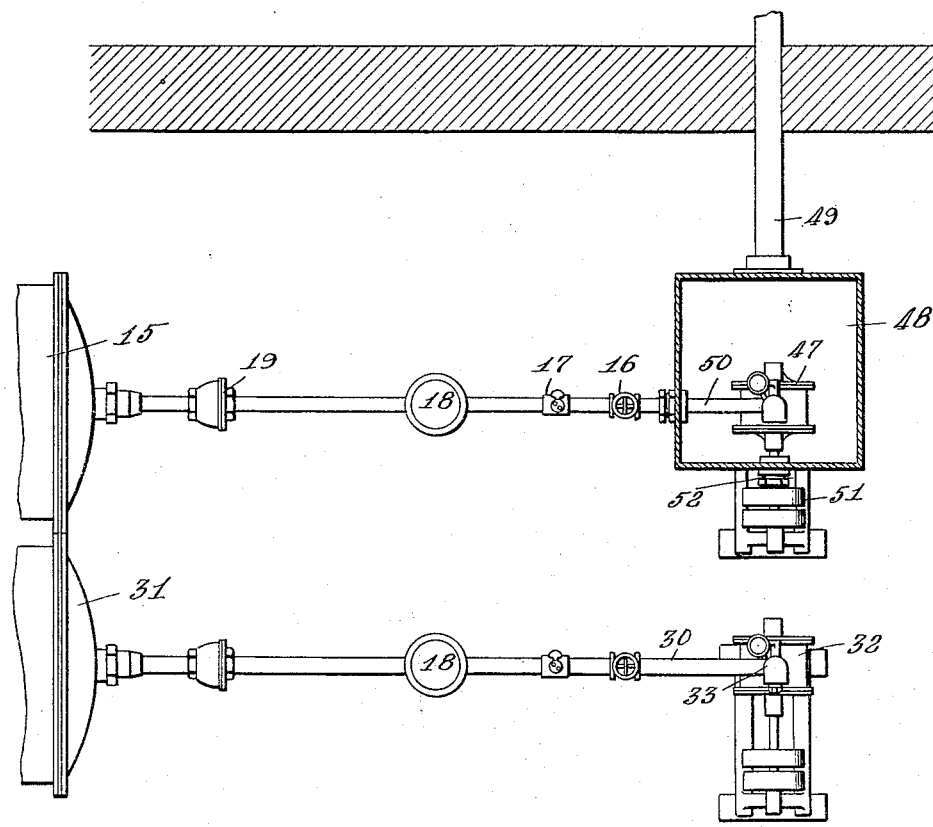

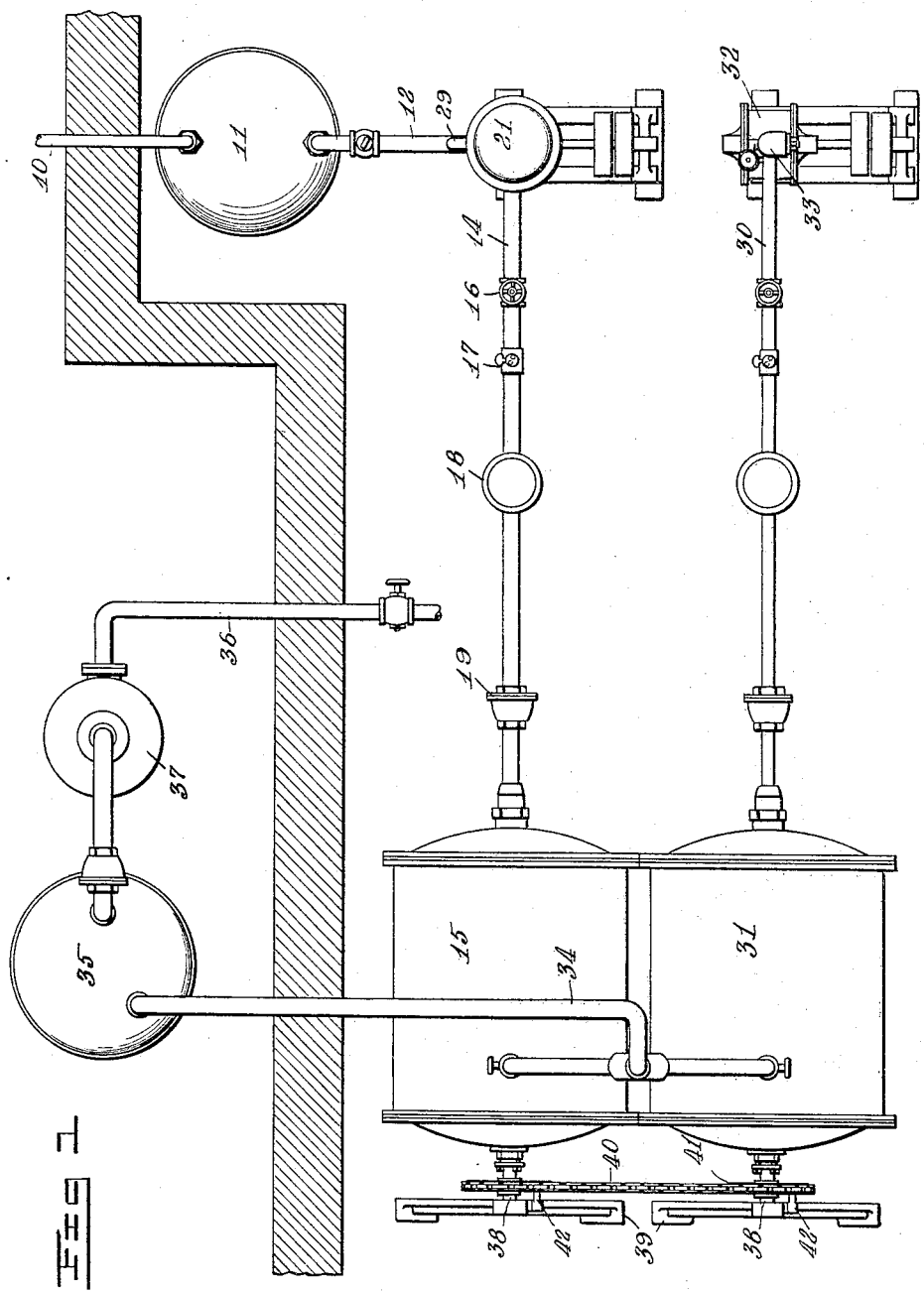

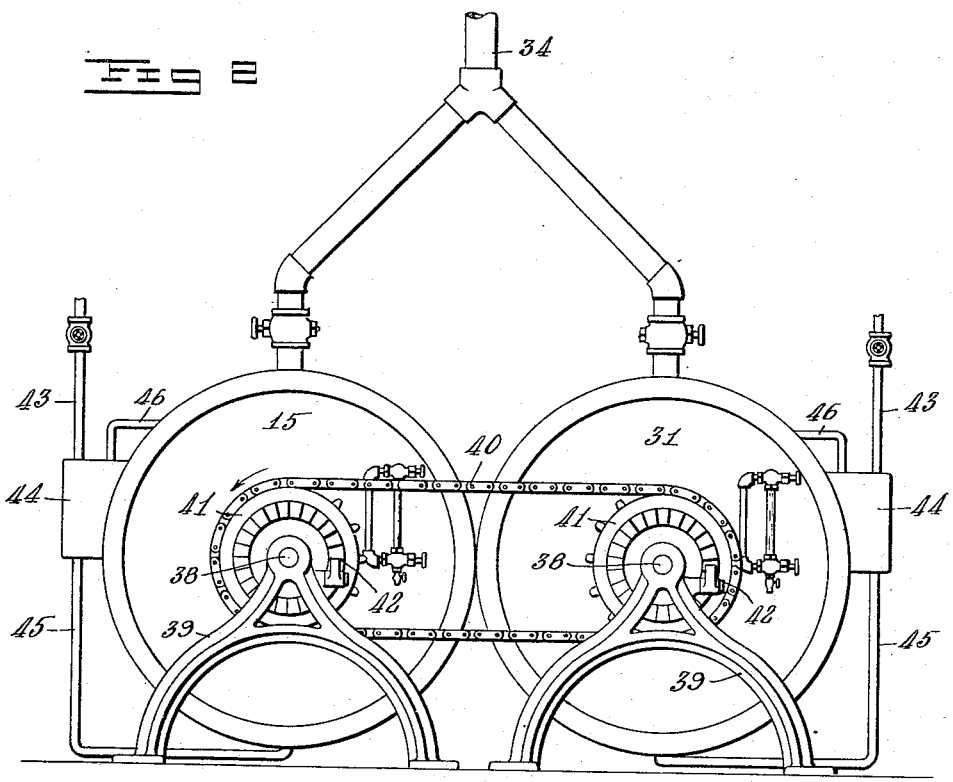

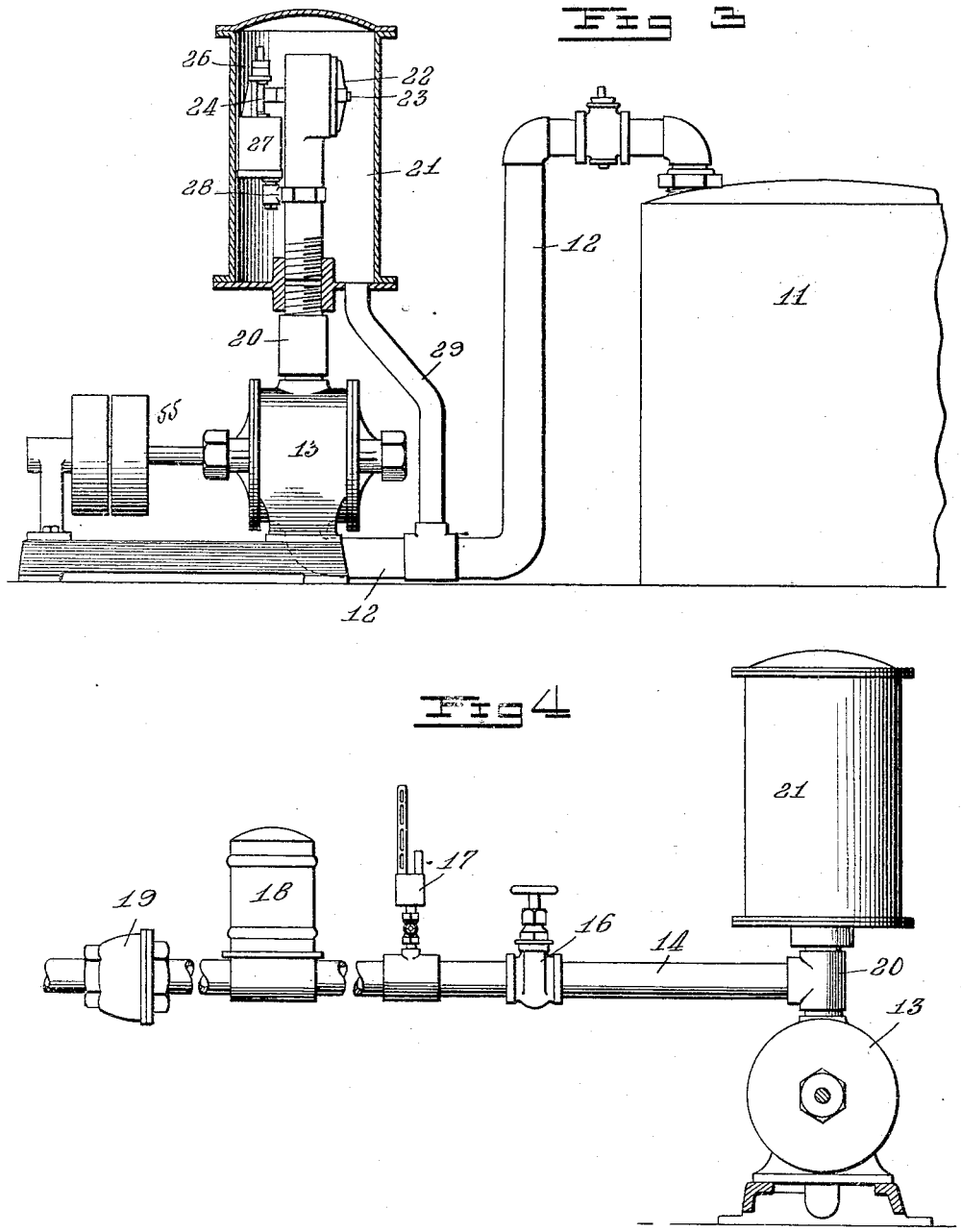

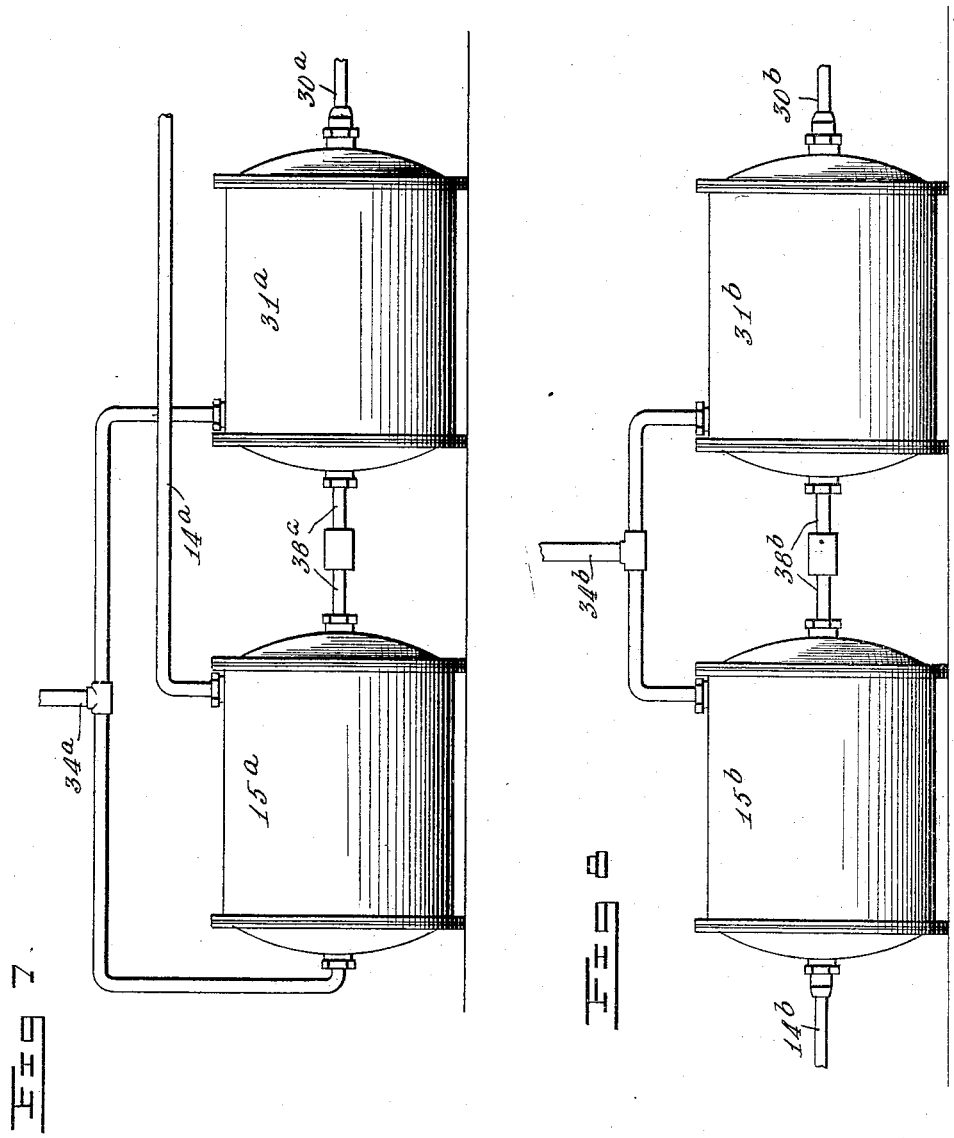

W. W. KEMP & W. H. VAN HORN.
GAS MIXING SYSTEM.
APPLICATION FILED APR. 22, 1913.

1,198,555.

Patented Sept. 19, 1916.
5 SHEETS—SHEET 5.

UNITED STATES PATENT OFFICE.

WILLIAM WALLACE KEMP AND WILLIAM H. VAN HORN, OF BALTIMORE, MARYLAND.

GAS-MIXING SYSTEM.

1,198,555.   Specification of Letters Patent.   Patented Sept. 19, 1916.

Application filed April 22, 1913. Serial No. 762,952.

*To all whom it may concern:*

Be it known that we, WILLIAM WALLACE KEMP and WILLIAM H. VAN HORN, citizens of the United States, residing at Baltimore, in the State of Maryland, have invented new and useful Improvements in Gas-Mixing Systems, of which the following is a specification.

The present invention relates to a gas mixing system, and has for its object to provide an apparatus by which aeriform fluids, for example air and manufactured or natural gas, may be mixed in exact and proper proportions so as to produce a fuel which will burn with perfect combustion; give increased efficiency of service; reduce the consumption of gas, and by the use of which Bunsen burners may be dispensed with, and the fire at the point of consumption of the mixture may be controlled by a single valve.

In the drawings herewith is illustrated one embodiment of the invention, which is, of course, susceptible of mechanical and structural changes and adaptations without departing from the spirit of the invention.

In the drawings: Figure 1 is a plan view of the apparatus. Fig. 2 is an end view looking from the left of Fig. 1. Fig. 3 is a detail view partly in section of the compressor or blower for the gas supply. Fig. 4 is a view in side elevation of the compressor or blower shown in Fig. 3, illustrating the connection to the metering wheel. Fig. 5 is a detail sectional view showing the means for regulating the pressure on the outlet side of the compressor. Fig. 6 is a view in elevation, looking from the right, Fig. 5. Fig. 7 is a view showing a method of coupling the metering wheels of the mixing apparatus. Fig. 8 is a similar view showing still another method of coupling the metering wheels. Fig. 9 is a view to show another manner of arranging the compressor or blower for feeding the gas.

Referring to the drawings by numerals, like numbers indicating like parts in the several views, 10 indicates an inlet pipe for gas which may come from the city mains, a gas well, or other suitable supply. Preferably the gas is led by the pipe 10 to a reservoir 11 for the purpose of providing always adjacent the machine a sufficient volume of gas from which to draw the supply for the mixing apparatus.

From the reservoir 11, by means of the pipe 12, the gas passes to a pump or blower 13, and from thence, under increased pressure, passes by pipe 14 to the metering wheel 15, said metering wheel being of any suitable type, it being understood that any desired type of metering wheel may be used without departing from the present invention.

The pipe 14 is provided with a cut-off valve 16, a pressure indicator 17, a reducer 18, and a non-return check valve 19, all conventionally shown, the said reducer 18 serving to deliver gas to the metering wheel 15 always at the desired pressure, dependent on the adjustment of the reducer.

In order that the blower or other compressor 13, driven continuously by the shaft and pulley 55 or other means, which feeds the gas to the metering wheel at increased pressure, may accommodate the varying consumption of fuel in the plant without building up pressure in the mixing apparatus, said blower 13 is provided with an escape pipe 20 delivering to a closed receiver 21, said escape pipe having an orifice which delivers to said receiver which is controlled by a valve 22, the valve in the present case being shown as of the oscillating type, although it will be understood that any suitable valve may be used. Said valve 22 is mounted on a shaft 23 having a crank arm 24 which is coupled with the stem of a piston 25, so that movements of the piston will be imparted to the shaft and valve 22, the piston being preferably provided with weights 26 tending to hold it normally in its down position with the valve 22 closed through the action of the piston stem on the crank arm and rock shaft of the valve. The piston 25 is mounted in the open topped cylinder 27 which is coupled by a suitable passage 28 with the outlet pipe 20 coming from the blower 13.

With this construction it will be obvious that if, because of lessened consumption of gas, the constantly driven blower 13 is delivering more gas than can pass to the mixer, it will be delivered through the outlet pipe 20 to the receiver, and accumulation of pressure beneath the piston 25 sufficient to raise the piston, which is weighted proportionately to the maximum flow from the blower 13 through the pipe 14 to the metering wheel 15, will elevate the piston 25, and through the crank arm 24 and rock shaft 23 open the valve 22 more or less and permit the accumulated gas to escape to the receiver 21. The receiver 21 is coupled by the bypass 29 with the inlet pipe 12 which leads the gas from the supply to the blower 13, as best shown in Fig. 3, and the gas in the receiver 21 will return by way of the bypass 29 and pipe 12 to the blower 13, and a complete circulating loop is, therefore, provided between the metering wheel and the supply, so as to care for all the varying conditions. Immediately the consumption of gas is resumed or increased and pressure falls in the cylinder 27, the piston 25 will be moved downwardly by the weights and the valve 22 closed, cutting out the loop or by-pass.

In actual practice while the plant is in operation the valve 22 will be active practically all the time, for slight fluctuations in pressures occur due to various causes in the operation of these plants, and this controller is so sensitive and quickly responsive to any fluctuations that the valve 22 will constantly oscillate between its closed and open position, thus maintaining always a uniform pressure in the passage 14 which delivers to the metering wheel.

The supply of air which is to be commingled with the gas to make the fuel is fed by means of passage 30 to the air metering wheel 31, this pipe 30 being identical in all respects to the pipe 14, and having the cut-off valve, pressure indicator, reducer, and check valve, all as described in connection with the gas pipe. Furthermore, the air supply in the pipe 30 is maintained and controlled by means of the blower 32 and the valve and piston control mechanism 33, which is identical in structure and operation with the control just described in connection with the gas pipe, except that, as shown in Fig. 1, this controlling mechanism for the air is not inclosed in a casing as is the gas controlling mechanism, for any excess of air may, of course, be permitted to pass to the atmosphere through the valve 22 without loss or bad results.

The metering wheels 15 and 31, meter and proportion the air and gas in the quantities desired for mixture, such metering devices being so constructed as to deliver each its proportionate amount of fluid, and from these two meters a Y or other suitable outlet 34 is provided by means of which the air and gas are lead to any suitable chamber 35, and thence to the outlet pipe 36 which delivers the fuel to the point of consumption, a back-fire preventer 37 of any suitable type being preferably provided outside the building, as best shown in Fig. 1.

The shafts 38 of the metering wheels are mounted in suitable standards 39, as best shown in Fig. 2, and in order that their rotation may be uniform are coupled by the sprocket chain 40 engaging suitable sprockets 41, the ends of the shafts, and preferably these sprocket wheels, being provided on their faces with pawl and ratchet mechanism 42 which will prevent the possibility of reverse or backward movement of the wheel.

The metering wheels when of the "cupping" type may be supplied with water through the pipe 43 which delivers to a supply tank 44 shown conventionally, and which may have any suitable float control or other valve for regulating the water supply which passes by the pipe 45 from the supply tank 44 to the meter, a pressure equalizing pipe 46 being provided to equalize pressure in the meter and the supply tank.

In Figs. 1 and 2 the metering wheels are shown abreast, but they may be arranged in tandem, as shown in Fig. 7, and their shafts $38^a$ directly coupled by any suitable coupling. With this arrangement the gas will enter the meter $15^a$ by the gas pipe $14^a$ leading to the side thereof instead of at the end, and be delivered from the end by passage $34^a$, and the air delivered to the air meter $31^a$ will enter by the pipe $30^a$ and be delivered and commingled with the gas at the Y or outlet $34^a$.

In the arrangement shown in Fig. 8 the meters $15^b$ and $31^b$ are arranged in tandem with their shafts $38^b$ directly coupled with the air inlet $30^b$ delivering at the end of the air meter $31^b$, and the gas inlet $14^b$ delivering at the end of the gas meter $15^b$, the outlet $34^b$ for the gas and air being from the sides of the respective meters.

In Fig. 9 we have shown another arrangement of blower for handling gas, in which the entire blower 47 is located within a casing 48, to which casing the inlet pipe 49 for the gas is connected, and the blower taking the gas delivered at city pressure to the casing forces it out of the outlet 50 at higher pressure. The blower is driven by means of the shaft and pulley 51 projecting through a suitable stuffing box outside the casing, and by this arrangement only one stuffing box 52 for the drive shaft of the blower is necessary. The blower 47 will be provided with the same regulating valve to take care of the outlet pressures as described in connection with the blower 13, and in event of excess pressure the valve will open, and the excess gas will be delivered directly to the casing 48, to be again passed through the blower.

Having thus described our invention what we claim is:—

1. In a gas mixing system, and in combination, a gas compressor adapted to maintain gas under pressure, an air compressor independent of said gas compressor adapted to maintain the air under pressure, a receptacle into which both the air and gas discharge and from which the mixed gas is led off for consumption, gas measuring means in series with and interposed between said gas compressor and said receptacle, air measuring means in series with and interposed between said air compressor and said receptacle, coupling means between said gas measuring means and air measuring means whereby the same operate in unison to admit the air and gas to said receptacle in a predetermined and exact proportion, and independent pressure regulating means for each of said measuring means on the outlet side of each of said compressors.

2. In a gas mixing system, and in combination, a gas compressor, gas measuring means in series with and connected to the outlet of said compressor, an air compressor independent of said gas compressor, air measuring means in series with and connected to the outlet of said air compressor, means for positively coupling said gas and air measuring means whereby the same operate in unison to maintain uniform and proportional operation thereof, and a receptacle into which each of the measuring means discharge.

3. In a gas mixing system, and in combination, a gas compressor, an air compressor, automatic means actuated by the pressure in the compressor outlets to maintain a constant delivery pressure from each of said compressors, gas measuring means in series with said gas compressors, air measuring means in series with said air compressors, coupling means between said gas and air measuring means whereby to maintain a predetermined and exact ratio of gas and air passing through the same and a receptacle into which said gas measuring means and air measuring means discharge and from which the mixed gases are led off for consumption.

4. In a gas mixing system, and in combination, a gas compressor, an air compressor, automatic means for each of said compressors actuated by the pressure in the compressor outlets to prevent excessive pressure, independent pressure reducing means in series with each of said compressors to maintain a perfectly even pressure of the gas and air, gas measuring means in series with said gas compressor, air measuring means in series with said air compressor, coupling means between said gas and air measuring means whereby to maintain a predetermined and exact ratio of gas and air passing through the same, and a receptacle into which said gas measuring means and air measuring means discharge and from which said mixed gases are led off for consumption.

In testimony whereof we have hereunto set our hands in presence of three subscribing witnesses.

WILLIAM WALLACE KEMP.
WILLIAM H. VAN HORN.

Witnesses:
CHARLES T. BYRNES,
BELVA B. BLAKE,
J. MARSH MATTHEWS.

Copies of this patent may be obtained for five cents each, by addressing the "Commissioner of Patents, Washington, D. C."